United States Patent [19]

McCarthy et al.

[11] Patent Number: 4,804,573
[45] Date of Patent: Feb. 14, 1989

[54] PACKAGING MATERIALS

[76] Inventors: Brian A. McCarthy, 50 Kinvara Road, Navan Road, Dublin 7; John P. McKeon, Mount Pleasant, Church Road, Greystones, Co Wicklow, both of Ireland

[21] Appl. No.: 45,818

[22] Filed: May 4, 1987

[30] Foreign Application Priority Data

May 5, 1986 [IE] Ireland .................................. 1188/86
Sep. 23, 1986 [BE] Belgium ................................ 217200

[51] Int. Cl.$^4$ .......................... B05D 1/36; B32B 27/08; C09J 7/02
[52] U.S. Cl. ...................................... 428/201; 428/204; 428/205; 428/343; 428/355; 428/422; 428/474.4; 428/480; 428/484; 428/500; 428/522
[58] Field of Search ............... 428/343, 422, 492, 201, 428/480, 474.4, 500, 522, 484, 204, 205, 355

[56] References Cited

U.S. PATENT DOCUMENTS 4,704,163 11/1987 Baratto et al. .................. 428/343 X
4,708,907 11/1987 Flutti et al. ..................... 428/343 X

*Primary Examiner*—Thomas J. Herbert
*Attorney, Agent, or Firm*—Cushman, Darby & Cushman

[57] ABSTRACT

A packaging material for foodstuffs comprises a sheet material having on the rear face a water-based or water-borne cold seal adhesive applied thereto without a primer coat and on the front face a water-based or water-borne overprint varnish applied over the printed matter. The cold seal adhesive is applied to chosen areas of the rear face by conventional means and then dried.

The cold seal adhesive may suitably be a combination of one or more cohesive latex materials such as synthetic rubber emulsions or butyl or nitrile rubber emulsions but more particularly natural rubber latex, combined with a water-based or water-borne synthetic coating resin, particularly a polyamide resin emulsion or dispersion
an acrylic resin emulsion or dispersion
a polystyrene resin emulsion or dispersion
a polyester resin emulsion or dispersion
a polyvinylidene chloride resin emulsion or dispersion or a combination of any of the above emulsions or dispersions with each other or with a polyvinyl ethylene emulsion
a polyvinyl alcohol emulsion
a polyvinyl acetate emulsion
a carboxy methyl cellulose solution in water with or without the addition of waxes or antifoam agents.

The sheet material is normally wound up on a reel for storage purposes, with the result that the rear face comes into contact with the front face. However it is one of the principal features of the present invention that the overprint varnish prevents damage to the printed matter and prevents the two faces adhering together during storage despite the conditions of pressure and ambient temperature found in the reel; and when the sheet material is unwound from the reel, the overprint varnish allows release of the rear face bearing the cold seal adhesive without blocking.

10 Claims, No Drawings

PACKAGING MATERIALS

BACKGROUND OF THE INVENTION

1. Field of the Invention

This invention relates to packaging materials, particularly for packaging foodstuffs.

2. Description of Related Art

Packaging materials of the sheet-type are well known. Such materials include plastics films, polyolefins, foils (including aluminium foil) and papers. It is also known to print Trade Marks, labelling and other information onto such sheet-type materials and to apply an overprint varnish over the printing in order to protect it. However such overprint varnishes have generally been solvent-based, which can give rise to environmental problems. In addition, an adhesive is applied to selected areas of the rear face of the material, for the purpose of sealing a packaging article made with the sheet material. Such adhesive must not adhere to the front face of the material when it is being stored, for example in a roll, prior to use, but must act to seal the packaging article when two sheets of the material are brought together, rear face to rear face, under pressure. Although a cold seal adhesive is known for this purpose, it has been difficult to get this adhesive to adhere on certain sheet-type materials without a solvent-based primer.

SUMMARY OF THE INVENTION

The present invention provides a packaging material comprising a sheet material having on the rear face a water-based or water-borne cold seal adhesive applied thereto without a primer coat and on the front face a water-based or water-borne overprint varnish. Normally the front face also has printing applied thereto, under the overprint varnish.

The cold seal adhesive may be applied to chosen areas of the rear face by conventional means e.g. gravure, reverse roller coating, flexo, pattern coating or air knife coating. The adhesive may then be dried by conventional means, e.g. in an oven.

The printing process may be carried out by conventional means on the front face, and the overprint varnish may then be applied thereover, also by conventional means. The sheet material is then normally wound up on a reel for storage purposes, with the result that the rear face comes into contact with the front face. However it is one of the principal features of the present invention that the overprint varnish prevents damage to the printed matter and prevents the two faces adhering together during storage despite the conditions of pressure and ambient temperature found in the reel; and when the sheet material is unwound from the reel, the overprint varnish allows release of the rear face bearing the cold seal adhesive without blocking.

In making a packaging article, two portions of the rear face of the sheet material are brought together with the areas bearing the cold seal adhesive in alignment, and pressure is then applied to cause the cold seal material to cohere and thus bond the two sheet portions together.

The cold seal adhesive may suitably be a combination of one or more cohesive latex materials such as synthetic rubber emulsions or butyl or nitrile rubber emulsions but more particularly natural rubber latex, combined with a water-based or water-borne synthetic coating resin, particularly a polyamide resin emulsion or dispersion
an acrylic resin emulsion or dispersion
a polystyrene resin emulsion or dispersion
a polyester resin emulsion or dispersion
a polyvinylidene chloride resin emulsion or dispersion or a combination of any of the above emulsions or dispersions with each other or with
a polyvinyl ethylene emulsion
a polyvinyl alcohol emulsion
a polyvinyl acetate emulsion
a carboxy methyl cellulose solution in water with or without the addition of waxes or antifoam agents.

A water-borne synthetic resin e.g. a polyamide resin uses ethyl alcohol as co-solvent with the water.

The latex material may suitably comprise from 10 to 120 parts by weight while the synthetic resin may suitably comprise from 10 to 175 parts by weight.

The proportions of latex/synthetic resin are dependent on the commercial end use which can vary from low pressure sealing e.g. for form-and-fill chocolate wraps (which requires a higher proportion of latex), and higher pressure sealing e.g. standard crimp-seal chocolate wraps at about 80 pounds per square inch (650 kPa) (which requires a lower proportion of latex). The proportions may suitably be in the range of 100–155 parts by weight of synthetic resin.

A cold seal adhesive containing a polyamide or acrylic resin emulsion or dispersion can adhere satisfactorily to most commercial packaging films without a coating of a primer. The same applies to an adhesive containing a polystyrene resin emulsion or dispersion on certain films such as treated orientated polypropylene films.

The overprint varnish may also suitably be a water-based synthetic resin, particularly the resin emulsions or disperions mentioned above for the cold seal adhesive with or without the addition of polytetrafluorethylene dispersions in water, polypropylene wax emulsions or dispersions in water, or combinations of both.

The synthetic resins used in the present invention are coating resins which form a coat on the surface of a substrate e.g. of film or paper. Such coating resins are commercially available from several suppliers to the coating trade.

DESCRIPTION OF THE PREFERRED EMBODIMENTS

The invention is illustrated in the following non-limiting Examples.

EXAMPLE 1

A cold seal adhesive was made up as follows:

| | Parts by weight |
|---|---|
| Natural rubber latex, 60% solids | 59.90 |
| Polyamide resin aqueous dispersion, designation TPO1274 (available from Schering Chemicals Limited, Burgess Hill, Sussex, England), 30–35% | 40.00 |
| BALAB Antifoam Agent | 0.10 |

This adhesive was applied by Flexo to boundary areas of the rear face of orientated polypropylene packaging film, without any primer coating.

An overprint varnish was made up as follows:

|  | Parts by weight |
|---|---|
| Polyamide resin aqueous dispersion TPO 1274 | 90 |
| Paraffin wax dispersion | 5 |
| Water | 5 |

An optional 0.5% of antifoaming agent was also added when required.

This overprint varnish was applied to the front face of the film.

The film was wound up on a reel and then unwound without any problem of adhesion by the rear face against the front face. Two portions of the film were then placed together with the rear faces against one another and the boundary areas bearing the cold seal adhesive in contact with one another. Pressure was applied to the boundary areas by a SENTINEL pressure sealer available from Packaging Industries Inc., Hyannis, Mass., USA operating at 80 p.s.i. (650 kPa) for 0.5 seconds on cold serrated sealing jaws. The two portions of film were sealed together and the seal was satisfactory.

To test the release properties of the overprint varnish from the cold seal adhesive the following tests were performed:

Orientated polypropylene film to which the cold seal adhesive had been applied was cut into samples 2 inches×4 inches (5 cm×10 cm) as a first preparation for the blocking test.

The overprint varnish was applied onto a separate sheet of the same orientated polypropylene film by means of a No. 3 wire rod (approx. 2-2½pounds (0.9-1.13 kg) dry/3000 sq. ft. (279 m$^2$)) and dried for approx. 30 seconds at 225° F. (107° C.) and then allowed to return to ambient conditions.

The sample bearing the cold seal adhesive was then brought into face to face contact with the sample bearing the overprint varnish and positioned in an I C block tester. A test at 30 pounds per square inch for 16 hours at 50° C. was conducted and a successful release of the two film samples was obtained.

EXAMPLE 2

Example 1 was repeated except that the polyamide resin dispersion in the cold seal adhesive and the overprint varnish was replaced by a commercially available acrylic coating resin aqueous dispersion, 40-50% solids, and comparable successful results were obtained.

EXAMPLE 3

Example 1 was repeated using a mixed polyamide resin dispersion available from Schering Chemicals Limited under the designation TP01267. Successful results were again obtained.

EXAMPLE 4

Example 1 was repeated again except that the polyamide resin dispersion in both the cold seal adhesive and the overprint varnish was replaced by a commercially available polystyrene coating resin aqueous dispersion. No primer coating was needed for the cold seal adhesive. Similar successful results were obtained.

The cold seal adhesive of each of Examples 1-4 can also be used with the overprint varnish of any of the other Examples, e.g. a cold seal adhesive based on natural rubber latex and a polyamide resin dispersion on one face and an overprint varnish based on an acrylic resin dispersion on the other face.

A polytetrafluoroethylene resin such as Aqua Polyfluoro 411 available from Micro Powders Inc., Yonkers, N.Y., USA, may also be used in the overprint varnish, with or instead of the polypropylene wax.

We claim:

1. A packaging material comprising a sheet material having a front face and a rear face and being adapted to be sealed rear-face-to-rear-face by application of pressure to selected areas, said sheet material having on said selected areas of the rear face a water-based cold seal adhesive applied thereto without a primer coat, said cold seal adhesive having cohesive properties, and on the front face a water-based or water-borne overprint varnish.

2. A packaging material according to claim 1, wherein the front face also has printing applied thereto, under the overprint varnish.

3. A packaging material according to claim 1, wherein the cold seal adhesive has been applied to chosen areas of the rear face and dried thereon.

4. A packaging material according to claim 1 wherein the cold seal adhesive is a combination of one or more cohesive latex materials with a water-based or water-borne synthetic coating resin.

5. A packaging material according to claim 4, wherein the cohesive latex material is natural rubber latex.

6. A packaging material according to claim 4, wherein the water-based synthetic coating resin is selected from
   a polyamide resin emulsion or dispersion
   an acrylic resin emulsion or dispersion
   a polystyrene resin emulsion or dispersion
   a polyester resin emulsion or dispersion
   a polyvinylidene chloride resin emulsion or dispersion
or
   a combination of any of the above emulsions or dispersions with each other or with
   a polyvinyl ethylene emulsion
   a polyvinyl alcohol emulsion
   a polyvinyl acetate emulsion
   a carboxy methyl cellulose solution in water
   with or without the addition of waxes or antifoam agents.

7. A packaging material according to claim 4, wherein the latex material comprises from 10 to 120 parts by weight while the synthetic resin comprises from 10 to 175 parts by weight.

8. A packaging material according to claim 7, wherein the proportions are in the range of 100-200 parts by weight of latex to 100-155 parts by weight of synthetic resin.

9. A packaging material according to claim 1, wherein the overprint varnish is a water-based synthetic coating resin.

10. A packaging material according to claim 9, wherein the overprint varnish is selected from the resin emulsions or dispersions identified in claim 6 with or without the addition of polytetrafluoroethylene dispersions in water, polypropylene wax emulsions or dispersions in water, or combinations of both.

* * * * *